(12) United States Patent
Yang et al.

(10) Patent No.: US 9,525,980 B2
(45) Date of Patent: Dec. 20, 2016

(54) METHOD AND SYSTEM FOR TRIGGERING TERMINAL GROUP

(75) Inventors: Kun Yang, Shenzhen (CN); Hao Wu, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/000,575

(22) PCT Filed: Nov. 21, 2011

(86) PCT No.: PCT/CN2011/082554
§ 371 (c)(1),
(2), (4) Date: Aug. 20, 2013

(87) PCT Pub. No.: WO2012/151928
PCT Pub. Date: Nov. 15, 2012

(65) Prior Publication Data
US 2014/0141828 A1    May 22, 2014

(30) Foreign Application Priority Data
Aug. 8, 2011 (CN) .......................... 2011 1 0225648

(51) Int. Cl.
*H04B 7/00* (2006.01)
*H04W 4/08* (2009.01)
*H04W 76/02* (2009.01)

(52) U.S. Cl.
CPC ............... *H04W 4/08* (2013.01); *H04W 76/02* (2013.01)

(58) Field of Classification Search
CPC ........ H04W 4/005; H04W 4/00; H04W 4/001; H04W 12/06; H04W 4/08; H04W 60/00; H04W 8/26; H04W 76/02; H04W 72/048; H04W 74/002; H04W 88/02; H04W 8/22; H04W 68/00; H04W 72/005; H04W 74/00; H04W 28/0215; H04W 28/26; H04W 4/021
See application file for complete search history.

(56) References Cited

U.S. PATENT DOCUMENTS

2003/0228865 A1* 12/2003 Terry ..................... H04W 48/08
455/422.1
2012/0106431 A1* 5/2012 Wu et al. ...................... 370/312
(Continued)

FOREIGN PATENT DOCUMENTS

CN         1331524        1/2002
CN       101047954       10/2007
(Continued)

OTHER PUBLICATIONS

International Search Report for International Patent Application No. PCT/CN2011/082554, mailed May 3, 2012.
(Continued)

*Primary Examiner* — Golam Sorowar
(74) *Attorney, Agent, or Firm* — McAndrews, Held & Malloy, Ltd.

(57) ABSTRACT

The disclosure discloses a method for triggering a terminal group, including that a network side sending a group triggering message to each terminal of the terminal group, wherein the group triggering message is used for indicating each terminal of the terminal group to connect to the network, and each terminal of the terminal group establishing connection with the network according to the group triggering message. The disclosure also discloses a system for triggering a terminal group, which realizes to synchronously trigger all the terminals of one terminal group, and makes the operator network better optimize the message volume of the terminal group which needs to receive the same messages when the Group Based Addressing characteristic of the terminal group is activated.

9 Claims, 5 Drawing Sheets

(56) References Cited

U.S. PATENT DOCUMENTS

2012/0214520 A1* 8/2012 Bergqvist et al. ............ 455/458
2012/0252518 A1* 10/2012 Karampatsis et al. ........ 455/515
2013/0136072 A1* 5/2013 Bachmann et al. .......... 370/329

FOREIGN PATENT DOCUMENTS

CN 101257665 9/2008
EP 2566200 A1 3/2013

OTHER PUBLICATIONS

Communication with Supplementary European Search Report corresponding to European Application No. EP 11865011, Jul. 10, 2014, 10 pages.
"3rd Generation Partnership Project; Technical Specification Group Services and System Aspects; System Improvements for MachineType Communications; (Release 11)", 3GPP Standard; 3GPP TR 23.888, 3rd Generation Partnership Project (3GPP), Mobile Competence Centre; 650, Route Des Lucioles; F-06921 Sophiaantipolis Cedex; France, vol. SA WG2, No. V1.4.0, Aug. 5, 2011, pp. 1-139, XP050553713.
ZTE Corporation: "pCR to MTC Group Identifier", 3GPP Draft; PCT to MTC Group Identifier, 3rd Generation Partnership Project (3GPP), Mobile Competence Centre; 650, Route Des Lucioles; F-06921 Sophia-Antipolis Cedex; France, vol. SA WG3, No. Chengdu; 20110411, Apr. 2, 2011 XP050526621.

\* cited by examiner

METHOD AND SYSTEM FOR TRIGGERING TERMINAL GROUP

FIELD OF THE INVENTION

The disclosure relates to the Machine Type Communication (MTC) technology, and in particular to a method and a system for triggering a terminal group.

BACKGROUND OF THE INVENTION

The cellular wireless communication system mainly consists of a Core Network (CN), a Radio Access Network (RAN) and terminals, wherein the CN takes charge of the Non Access Stratum (NAS) transaction, such as the terminal position updating and the like, and the CN is an anchor point of a user plane. The RAN takes charge of the access stratum transaction (such as the management of a wireless resource), and may includes base stations, or may includes base stations and base station controllers. Each base station of the RAN may be connected to at least one CN node, and the physical or logical connection can exist between the base stations according to the actual situations. As shown in FIG. 1, the base station 1 and the base station 2 are connected, the base station 1 and the base station 3 are connected, but the base station 2 and the base station 3 are unconnected. A terminal, namely User Equipment (UE), refers to the device which can be communicated with the cellular wireless communication network, such as the mobile phones, or notebook computers and the like.

An MTC service is the service for implementing communication between the machines. The MTC service needs no manual intervention, and all the communications are automatically completed by the machines. In the MTC service, data is acquired by the sensing equipment such as a sensor and the like. The data is managed by a special server of a mobile operator or an MTC operator, and may be viewed by MTC users or MTC managers, and then, the data is reported to the mobile communication network via the communication equipment, and is accessed to a public data network via the mobile communication network. The public data network may be a logistics monitoring network, a safety monitoring network, a remote medical testing network, a remote meter-reading network and the like. In the above process, the equipment for acquiring the data which is required by the service is the terminal.

A Home Subscriber Server (HSS) is configured to save the identity information, authentication information and authorization information of the users or the terminal equipments. According to different situations, the HSS may be configured to save the identity information of the users and the binding information of the users and the terminal equipments, or only save the identity information of the users (the binding information of the users and the terminal equipments may be saved by a gateway), or directly save the identity information of the terminal equipments. The HSS also takes charge of the subscriber database, and implements identity authentication and authorization and the like of the users. A service platform may search the related information of the users or the terminals from the HSS.

A Mobility Management Entity (MME) is an entity for managing the terminal control signalling in the CN, and takes charge of accessing control, including authentication control, identification (GUTI, TAI list) assigning, authentication of the user identification and device identification, signalling surface encryption, consistency protection between the MME and eNB, transformation of security parameters and Quality of Service (QoS) parameters between 2G/3G and an Evolved Packet System (EPS), access admission control, determining whether to acquire the requested resource and reserve the corresponding resource, legal monitoring, mobility management (realizing the tracking and recording for the current position of the UE), session management, related operations for the EPS bearers, and network element selection and the like.

The MTC service has some characteristics which are different from the traditional mobile communication, such as the Group Based Addressing characteristic, wherein when the Group Based Addressing characteristic needs that the MTC terminal subscribes to one terminal group, the Group Based Addressing characteristic needs to be set and activated in the subscriber data of the terminal group, and then to be stored in the HSS, When the terminal is attached on the network, the MME acquires the subscriber data of the terminal from the HSS, and locally saves the data.

At present, for the Group Based Addressing characteristic of the MTC, no specific implementation mechanism is provided for synchronously triggering all the terminals of one terminal group, so that the operator network cannot better optimize the message volume of the terminal groups which need to receive the same messages when the Group Based Addressing characteristic is activated.

SUMMARY OF THE INVENTION

In view of this, the main object of the disclosure is to provide a method and a system for triggering a terminal group, which can synchronously trigger all the terminals of one terminal group, so as to make the operator network better optimize the message volume of the terminal groups which need to receive the same messages when the Group Based Addressing characteristic is activated.

In order to achieve the object, the technical solution of the disclosure is implemented as follows.

The disclosure provides a method for triggering a terminal group, including:

a network side sending a group triggering message to each terminal of the terminal group, wherein the group triggering message is used for indicating each terminal of the terminal group to connect to the network; and each terminal of the terminal group establishing connection with the network according to the group triggering message.

In the solution above, the step of the network side sending the group triggering message to each terminal of the terminal group, wherein the group triggering message is used for indicating each terminal of the terminal group to connect to the network, comprises: the network side sending the group triggering message to each terminal of the terminal group by broadcasting, wherein the group triggering message is used for indicating each terminal of the terminal group to connect to the network.

In the solution above, the step of the network side sending the group triggering message to each terminal of the terminal group, wherein the group triggering message is used for indicating each terminal of the terminal group to connect to the network, is embodied as:

the network side sending the group triggering message to each terminal of the terminal group, wherein the group triggering message comprises identification information of the terminal group or a terminal identification set of the terminal group.

In the solution above, the step of sending the group triggering message to each terminal of the terminal group, wherein the group triggering message is used for indicating each terminal of the terminal group to connect to the network, comprises:

a Machine Type Communication (MTC) server on the network side sending the group triggering message to a Home Subscriber Server (HSS), the HSS sending the group triggering message to a Mobility Management Entity (MME) which is configured to manage the terminal group, the MME sending the group triggering message to each base station which is corresponding to each terminal of the terminal group, and each base station which is corresponding to each terminal of the terminal group broadcasting the group triggering message to each terminal of the terminal group.

In the solution above, the step of sending the group triggering message to each terminal of the terminal group, wherein the group triggering message is used for indicating each terminal of the terminal group to connect to the network, comprises:

the MTC Server sending the group triggering message to a MTC gateway or a MTC agent, the MTC gateway or the MTC agent sending the group triggering message to the MME which is configured to manage the terminal group, the MME sending the group triggering message to each base station which is corresponding to each terminal of the terminal group, and each base station which is corresponding to each terminal of the terminal group broadcasting the group triggering message to each terminal of the terminal group.

In the solution above, the step of each terminal of the terminal group establishing the connection with the network according to the group triggering message comprises:

each terminal of the terminal group establishing the connection with the network, when receiving the group triggering message, detecting to have own Group Based Addressing characteristics and confirming that the terminal is a member of the terminal group which is indicated by the group triggering message.

In the solution above, confirming that the terminal is the member of the terminal group which is indicated by the group triggering message comprises:

the terminal confirming that the terminal is the member of the terminal group which is indicated by the group triggering message, when verifying that the identification information of the terminal group which is stored in the terminal is consistent with the identification information of the terminal group which is contained in the group triggering message;

or, the terminal confirming that the terminal is the member of the terminal group which is indicated by the group triggering message, when verifying that a terminal identification which is owned by the terminal is consistent with any one of the terminal identifications in the terminal identification set of the terminal group, wherein the terminal identification set of the terminal group is contained in the group triggering message.

In the solution above, the identification information of the terminal group is a Group Identification (GID) of the terminal group.

In the solution above, the terminal identification is an International Mobile Subscriber Identification Number (IMSI) of the terminal.

The disclosure provides a system for triggering a terminal group, including a network side equipment and a terminal group, wherein, the network side equipment is configured to send a group triggering message to each terminal of the terminal group, wherein the group triggering message is used for indicating each terminal of the terminal group to connect to the network; and each terminal of the terminal group is configured to establish connection with the network according to the group triggering message.

In the solution above, the network side equipment is further configured to send the group triggering message to each terminal of the terminal group by broadcasting, wherein the group triggering message is used for indicating each terminal of the terminal group to connect to the network.

In the solution above, the network side equipment is configured to send the group triggering message to each terminal of the terminal group, wherein the group triggering message comprises identification information of the terminal group or a terminal identification set of the terminal group.

In the solution above, the network side equipment comprises a MTC Server, a HSS, a MME which is configured to manage the terminal group, and each base station which is corresponding to each terminal of the terminal group, wherein, the MTC Server is configured to send the group triggering message to the HSS;

the HSS is configured to send the group triggering message to the MME;

the MME is configured to send the group triggering message to each base on which is corresponding to each terminal of the terminal group;

and each base station which is corresponding to each terminal of the terminal group is configured to broadcast the group triggering message to each terminal of the terminal group.

In the solution above, the network side equipment comprises the MTC Server, a MTC gateway or a MTC agent, the MME which is configured to manage the terminal group, and each base station which is corresponding to each terminal of the terminal group, wherein the MTC Server s configured to send the group triggering message to the MTC gateway or the MTC agent;

the MTC gateway or the MTC agent is configured to send the group triggering message to the MME:

the MME is configured to send the group triggering message to each base station which is corresponding to each terminal of the terminal group;

and each base station which is corresponding to each terminal of the terminal group is configured to broadcast the group triggering message to each terminal of the terminal group.

In the solution above, each terminal of the terminal group is configured to establish the connection with the network, when receiving the group triggering message, detecting to have own Group Based Addressing characteristics and confirming that the terminal is a member of the terminal group which is indicated by the group triggering message.

In the solution above, each terminal of the terminal group is further configured to confirm that the terminal is the member of the terminal group which is indicated by the group triggering message when verifying that the identification information of the terminal group which is stored in the terminal is consistent with the identification information of the terminal group which is contained in the group triggering message; or, each terminal of the terminal group is configured to confirm that the terminal is the member of the terminal group which is indicated by the group triggering message, when verifying that a terminal identification which is owned by the terminal is consistent with any one of the terminal identifications in the terminal identification set of the terminal group, wherein the terminal identification set of the terminal group is contained in the group triggering message.

In the solution above, each terminal of the terminal group is a MTC terminal.

The method and the system for triggering the terminal group provided by the disclosure can synchronously trigger each terminal of the terminal group by sending the group triggering message, which indicates each terminal of the terminal group to connect to the network, and can make each terminal of the terminal group connect to the network according to the group triggering message, so as to synchronously trigger all the terminals of one terminal group, and make the operator network better optimize the message volume of the terminal groups which need to receive the same messages when the Group Based Addressing characteristic of the terminal group is activated.

DETAILED DESCRIPTION OF THE INVENTION

The main idea of the disclosure is that: when needing to trigger a terminal group, a group triggering message, which is used for triggering each terminal of the terminal group to connect to the network, is sent to each terminal of the terminal group, so as to synchronously trigger all the terminals of the terminal group, and make the operator network better optimize the message volume of the terminal groups which need to receive the same messages when the Group Based Addressing characteristic is activated.

Figure 1:
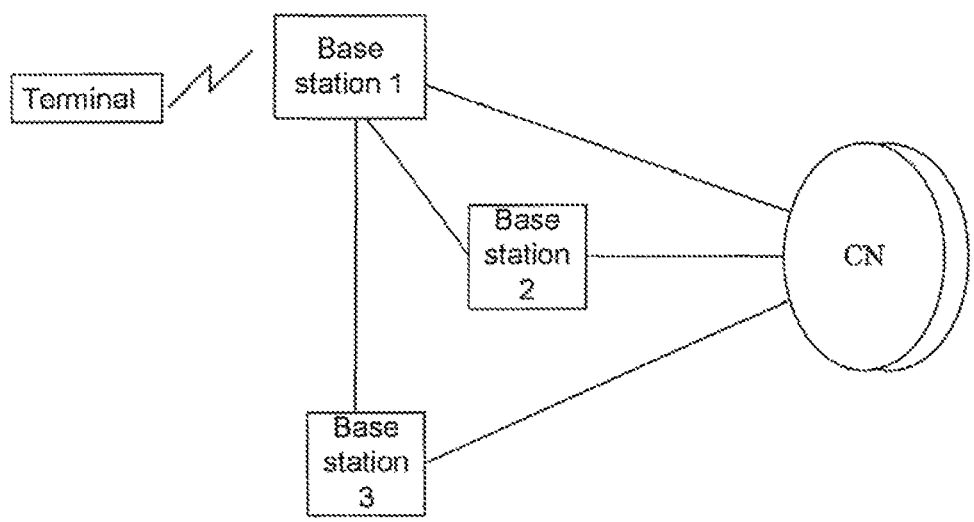
FIG. 1 is a schematic diagram of structure of a cellular wireless communication system according to one embodiment of the disclosure.
Figure 2:
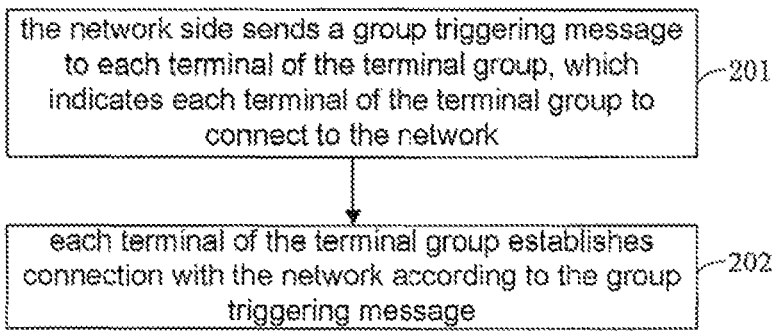
FIG. 2 is an implementation flowchart of a method for triggering a terminal group according to one embodiment of the disclosure.

The disclosure provides a method for triggering a terminal group. As shown in FIG. 2, the method mainly includes the following steps.

Step 201, the network side sends a group triggering message to each terminal of the terminal group, which indicates each terminal of the terminal group to connect to the network.

Here, the network side sends the group triggering message to each terminal of the terminal group by broadcasting, wherein the triggering message indicates each terminal of the terminal group to connect to the network.

In particular, the network side sends the group triggering message to each terminal of the terminal group, wherein the group triggering message contains identification information of the terminal group, or a terminal identification set of the terminal group.

In the above, the terminal identification set of the terminal group contains the terminal identification of each terminal of the terminal group.

In the actual application, the step that the network side sends the group triggering message which indicates each terminal of the terminal group to connect to the network may includes that a MTC Server sends the group triggering message to the HSS, the HSS sends the group triggering message to the MME which is configured to manage the terminal group, and the MME sends the group triggering message to each base station which is corresponding to each terminal of the terminal group. Each base station, which is corresponding to each terminal of the terminal group, sends the group triggering message to each terminal of the terminal group by broadcasting.

Or, the step that the network side sends the group triggering message which indicates each terminal of the terminal group to connect to the network may include that the MTC Server sends the group triggering message to an MTC gateway or an MTC agent, the MTC gateway or the MTC agent sends the group triggering message to the MME which is configured to manage the terminal group. The MME sends the group triggering message to each base station which is corresponding to each terminal of the terminal group, and each base station, which is corresponding to each terminal of the terminal group, sends the group triggering message to each terminal of the terminal group by broadcasting.

Step 202, each terminal of the terminal group establishes connection with the network according to the group triggering message.

In particular, after receiving the group triggering message, each terminal of the terminal group establishes the connection with the network when detecting to have own Group Based Addressing characteristics, and confirming that the terminal is a member of the terminal group which is indicated by the group triggering message.

Wherein, the step of confirming that the terminal is a member of the terminal group which is indicated by the group triggering message includes that: the terminal confirms to be the member of the terminal group which is indicated by the group triggering message when verifying that the own saved identification information of the terminal group is consistent with the identification information of the terminal group contained in the group triggering message, or, the terminal confirms to be the member of the terminal group which is indicated by the group triggering message when verifying that the own saved terminal identification is consistent with any one of the terminal identifications of the terminal identification set of the terminal group, wherein the terminal identification is contained by the group triggering message.

Here, before the Step 201, the method may further include: when each terminal of the terminal group accesses the network, each terminal of the terminal group is subscribed as the terminal with the Group Based Addressing characteristic, the identification information of the terminal group is distributed for the terminal group, and the identification information of the terminal group and/or the terminal identification set of the terminal group are saved in the MTC Server and the HSS, or the identification information of the terminal group and/or the terminal identification set of the terminal group are saved in the MTC Server and one of the MTC gateway and the MTC agent.

The identification information of the terminal group may be the Group ID (GID) of the terminal group, the terminal identification may be the International Mobile Subscriber Identification Number (IMSI) of the terminal, and the terminal identification set may be the IMSI set.

Correspondingly, the disclosure also provides a system for triggering a terminal group, including a network side equipment and a terminal group. The network side equipment is configured to send a group triggering message, which indicates each terminal of the terminal group to connect to the network. Each terminal of the terminal group is configured to establish connection with the network according to the group triggering message.

In the above, the network side equipment is further configured to send the group triggering message to each terminal of the terminal group by broadcasting, wherein the group triggering message is used for indicating each terminal of the terminal group to connect to the network.

In the above, the network side equipment is specifically configured to send the group triggering message to each terminal of the terminal group, wherein the group triggering message contains identification information of the terminal group, or the terminal identification set of the terminal group.

In particular, the network side equipment may include a MTC server, a HSS, a MME which is configured to manage the terminal group, and each base station which is corresponding to each terminal of the terminal group. In the above, the MTC server is configured to send the group triggering message to the HSS, the HSS is configured to send the group triggering message to the MME, the MME is configured to send the group triggering message to each base station which is corresponding to each terminal of the terminal group, and each base station which is corresponding to each terminal of the terminal group is configured to broadcast the group triggering message to each terminal of the terminal group.

Or, the network side equipment may include the MTC server, a MTC gateway or a MTC agent, the MME for managing the terminal group, and each base station which is corresponding to each terminal of the terminal group, wherein, the MTC server is configured to send the group triggering message to the MTC gateway or the MTC agent, the MTC gateway or the MTC agent is configured to send the group triggering message to the MME, the MME is configured to send the group triggering message to each base station which is corresponding to each terminal of the terminal group, and each base station which is corresponding to each terminal of the terminal group is configured to broadcast the group triggering message to each terminal of the terminal group.

In the above, each terminal of the terminal group is specifically configured to establish the connection with the network after receiving the group triggering message, detecting to have own Group Based Addressing characteristics, and confirming that the terminal is a member of the terminal group which is indicated by the group triggering message.

Here, each terminal of the terminal group is further configured to confirm that the terminal is the member of the terminal group which is indicated by the group triggering message when verifying that the own saved identification information of the terminal group is consistent with the identification information of the terminal group contained in the group triggering message, or, confirm that the terminal is to the member of the terminal group which is indicated by the group triggering message when verifying that the own saved terminal identification is consistent with any one of the terminal identifications in the terminal identification set of the terminal group, wherein the terminal identification is contained by the group triggering message.

In the above, each terminal of the terminal group is specifically the MTC terminal.

Embodiment I

Figure 3:
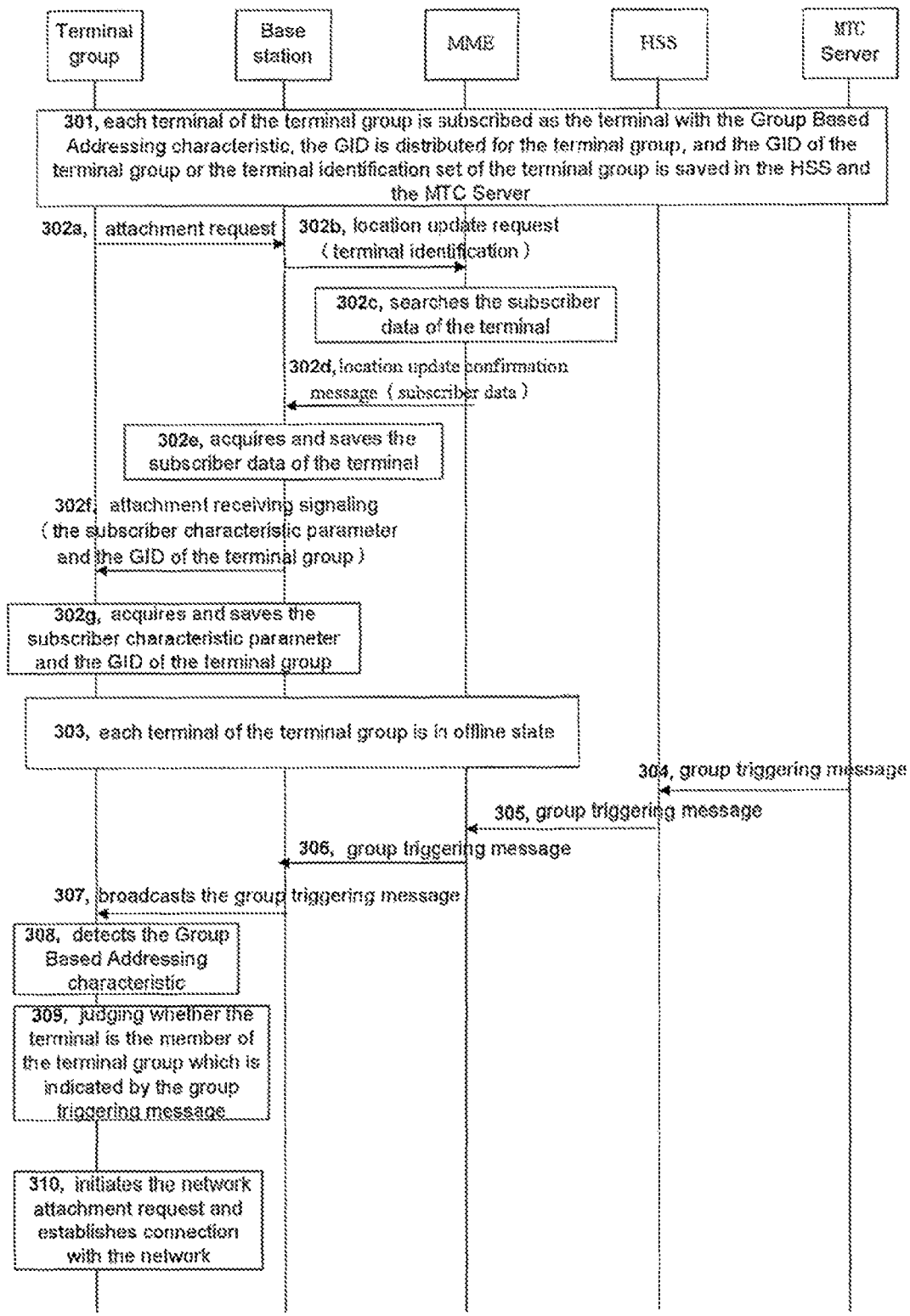
FIG. 3 is a specific flowchart for triggering a terminal group according to the embodiment I of the disclosure.

In the present embodiment, as shown in FIG. 3, the specific flow for triggering the terminal group may include the following steps.

Step 301, when each terminal of the terminal group accesses the network, each terminal of the terminal group is subscribed as the terminal with the Group Based Addressing characteristic, the GID is distributed for the terminal group, and the GID of the terminal group and/or the terminal identification set of the terminal group are/is saved in the HSS and the MTC Server.

Step 302, each terminal of the terminal group acquires and saves the own subscriber characteristic parameter and the GID of the terminal group which the terminal belongs to.

Here, the specific implementation flow of the Step 302 is as follows:

Step 302a, a terminal of the terminal groups sends an attachment request to the MME.

In the above, the attachment request may include the terminal identification and a security certificate of the terminal.

Step 302b, the MME receives the attachment request, and then sends the location update request message to the HSS for requesting the subscriber data of the terminal, after authenticating the terminal identification and the security certificate in the attachment request, wherein the location update request message contains the terminal identification, such as the IMSI of the terminal.

Step 302c, after receiving the location update request message sent by the MME, the HSS searches the subscriber data of the terminal according to the terminal identification in the location update request message. The subscriber data of the terminal contains subscriber characteristic parameter of the terminal, and the corresponding relationship between the terminal identification of the terminal and the GID of the terminal group which the terminal belongs to.

Here, the subscriber characteristic parameter of the terminal is used for representing the characteristics which are possessed by the terminal, such as the Group Based Addressing characteristic and the like. In particular, the subscriber characteristic parameter of the terminal may represent that the terminal has the Group Based Addressing characteristic or not, via specifically taking values.

Step 302d, the HSS sends the subscriber data of the terminal to the MME by the location update confirmation message.

Step 302e, the MME receives the location update confirmation message sent by the HSS, acquires the subscriber data of the terminal, extracts and saves the subscriber characteristic parameter of the terminal and the corresponding relationship between the terminal identification of the terminal and the GID of the terminal group, where the terminal belongs to, from the signing data.

Step 302f, the MME sends the attachment receiving signaling to the terminal, wherein the attachment receiving signaling contains the subscriber characteristic parameter of the terminal and the GID of the terminal group where the terminal is located.

Step 302g, the terminal receives the attachment receiving signaling, acquires and saves the own subscriber characteristic parameter and the GID of the terminal group where the terminal is located.

Step 303, after each terminal's service of the terminal group is completed, an attachment removing request is sent to the MME. After deleting the loading, the MME releases an S1-MME signaling connection, and the corresponding Radio Resource Control (RRC) connection also can be released, and now, each terminal of the terminal group is in offline state.

Step 304, when needing to trigger the terminal group, the MTC Server sends the group triggering message to the HSS, and indicates each terminal of the terminal group to establish connection with the network, wherein the group triggering message carries group information, and the group information may be set as the GID of the terminal group, or as the terminal identification set of the terminal group, for example, the group information is set as the IMSI set which contains the IMSI of each terminal of the terminal group.

Here, the group triggering message may further include a server address of the MTC server and/or a server identification of the MTC server.

Step 305, the HSS receives the group triggering message, and searches the identification of a target MME, which is configured to manage the terminal group, according to the group information in the group triggering message, and sends the group triggering message to the target MME via Insert Subscriber Data message according to the identification of the target MME;

In particular, the identification of the MME which is configured to manage the terminal group and the GID of the terminal group may be correspondingly preserved by the HSS. when the group information is set as the GID of the terminal group, the HSS adopts the GID of the group information as an index, and searches the identification of the target MME which is configured to manage the terminal group from the own saved subscriber data.

When the HSS can correspondingly preserve the identification of the MME which is configured to manage the terminal group and the terminal identification of each terminal of the terminal group, and the group information is set as the terminal identification set, the HSS takes the first terminal identification of the group information as the index, and searches the identification of the target MME which is configured to manage the terminal group from the own saved subscriber data.

Step 306, the MME sends the group triggering message to each base station which is corresponding to each terminal of the terminal group via the downlink NAS transmission message of an S1 interface.

Here, MME may search the identification of each base station which is corresponding to each terminal according to the terminal identification of each terminal, such as the IMSI of the terminal, and then sends the group triggering message to each base station according to the identification of each base station.

Step 307, each base station which is corresponding to each terminal of the terminal group expands the information element on the original System Information Block (SIB), and broadcasts the group triggering message in the mode of cell broadcast.

In particular, after adding one information element which is used for carrying the group triggering message in the original SIB, the base station broadcasts the SIB in the mode of cell broadcast.

Step 308, each terminal of the terminal group respectively receives the SIB which is broadcasted by the own base station, acquires the group triggering message from the SIB, and detects whether the Group Based Addressing characteristic is possessed by itself, if so, executing the Step 309, otherwise, ending the current flow.

in particular, if the terminal locally searches out the own subscriber characteristic parameter, and the subscriber characteristic parameter represents that the terminal has the Group Based Addressing characteristic, the terminal determines that the Group Based Addressing characteristic is possessed by itself. If the terminal does not search out the subscriber characteristic parameter, or the subscriber characteristic parameter represents that the terminal has no Group Based Addressing characteristic, the terminal determines that the Group Based Addressing characteristic is not possessed by itself.

Step 309, when each terminal of the terminal group detects that the Group Based Addressing characteristic is possessed by itself, judging whether the terminal is the member of the terminal group which is indicated by the group triggering message, if so, executing Step 310; otherwise, ending the current flow.

In particular, the terminal may judge whether being a member of the terminal group which is indicated by the group triggering message via the following two modes.

Mode I, the terminal compares the own saved GID of the terminal group with the GID of the terminal group of the group information in the group triggering message, if the comparison result is consistent, the terminal is the member of the terminal group which is indicated by the group triggering message, otherwise, the terminal is not the member of the terminal group which is indicated by the group triggering message.

Mode II, the terminal respectively compares the own terminal identification with each terminal identification of the terminal identification set of the group information in the group triggering message, if the terminal identification set of the group information has a terminal identification which is consistent with the terminal identification of the terminal, the terminal is the member of the terminal group which is indicated by the group triggering message, otherwise, the terminal is not the member of the terminal group which is indicated by the group triggering message.

Step 310, each terminal of the terminal group which is in the offline state initiates the network attachment request and establishes connection with the network.

Embodiment II

Figure 4:
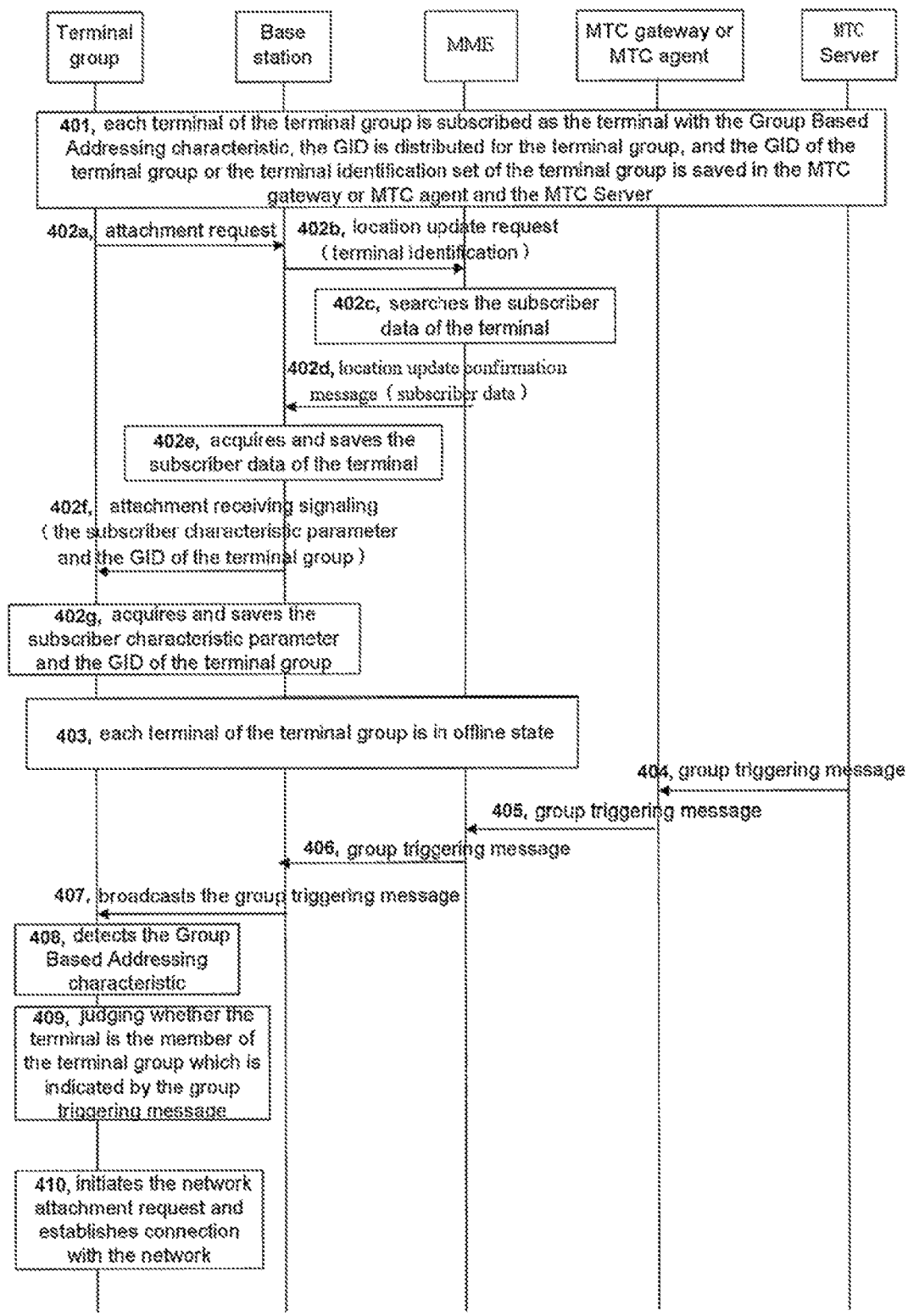
FIG. 4 is a specific flowchart for triggering a terminal group according to the embodiment II of the disclosure.

In the present embodiment, as shown in FIG. 4, the specific flow for triggering a terminal group may include the following steps.

Steps 401-403 are the same as the Steps 301-303, and the difference is that, in the present embodiment, the GID of the terminal group and/or the terminal identification set of the terminal group are/is saved in the MTC Server and one of the MTC gateway and the MTC agent.

Step 404, the MTC server sends the group triggering message to the MTC gateway or the MTC agent, and indicates each terminal of the terminal group which is in the offline state to establish connection with the network, wherein the group triggering message carries the group information. The group information may be set as the GID of the terminal group, or as the terminal identification set which contains each terminal's identification of the terminal group, such as the IMSI set which contains the IMSI of each terminal of the terminal group.

Here, the MTC gateway or the MTC agent includes the functions of protocol forwarding, addressing and the like.

Here, the group triggering message may further include the server address of the MTC server and/or the server identification of the MTC server.

Step 405, the MTC gateway or the MTC agent receives the group triggering message, and searches the identification of the target MME which is configured to manage each terminal of the terminal group according to the group information in the group triggering message, and sends the group triggering message to the target MME according to the identification of the target MME.

In particular, when the group information is set as the GID of the terminal group, the MTC gateway or the MTC agent takes the GID of the group information as the index, and searches the identification of the target MME, which is configured to manage each terminal of the terminal group, from the own saved subscriber data.

When the group information is set as the terminal identification set, the MTC gateway or the MTC agent takes the first terminal identification of the group information as the index, and searches the identification of the target MME, which is configured to manage each terminal of the terminal group, from the own saved subscriber data.

Steps 406-410 are completely the same as the Steps 306-310.

Embodiment III

Figure 5:
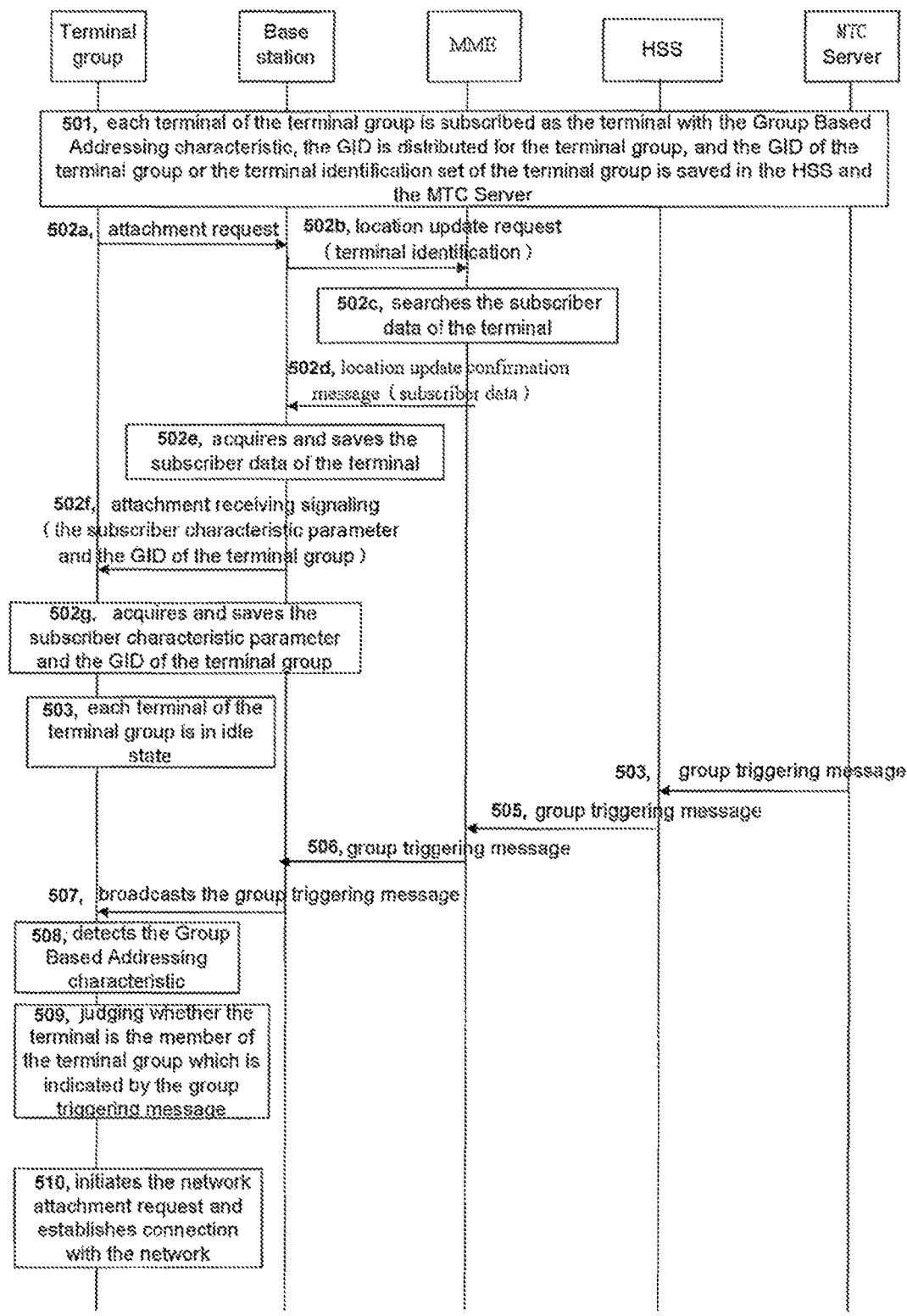
FIG. 5 shows a specific flowchart for triggering a terminal group according to the embodiment III of the disclosure.

In the present embodiment, as shown in FIG. 5, the specific flow for triggering a terminal group may include the following steps.

Steps 501-502 are completely the same as the Steps 301-302.

Step 503, each terminal of the terminal group has no service demand, and is in an idle state.

Steps 504-509 are completely the same as the Steps 304-309.

Step 510, each terminal of the terminal group which is in the idle state initiates a network attachment request and establishes the connection with the network.

Embodiment IV

Figure 6:
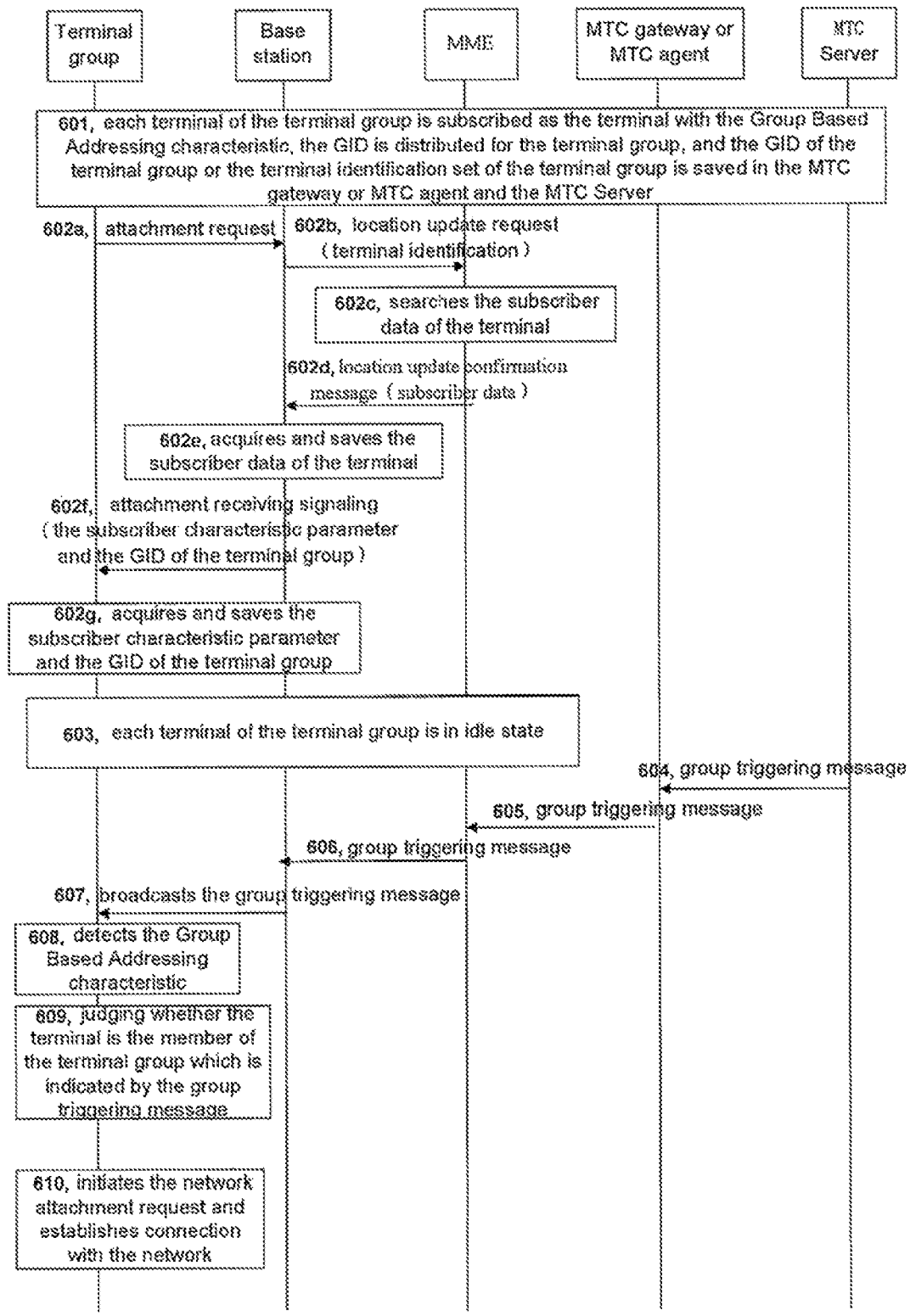
FIG. 6 shows a specific flowchart for triggering a terminal group according to the embodiment IV of the disclosure.

In the present embodiment, as shown in FIG. 6, the specific flow for triggering a terminal group may include the following steps.

Steps 601-602 are completely the same as the Steps 401-402.

Step 603 is completely the same as the Step 503.

Steps 604-609 are completely the same as the Steps 404-409.

Step 610 is completely the same as the Step 510.

The above is only the preferred embodiment of the disclosure and not intended to limit the scope of protection of the disclosure.

What is claimed is:

1. A method for triggering a terminal group, comprising:
a network side sending a group triggering message to each terminal of the terminal group, wherein the group triggering message is used for indicating each terminal of the terminal group to connect to the network, wherein the group triggering message is used for synchronously triggering all the terminals of one terminal group;
and
each terminal of the terminal group establishing connection with the network according to the group triggering message;
wherein the step of the network side sending the group triggering message to each terminal of the terminal group, wherein the group triggering message is used for indicating each terminal of the terminal group to connect to the network, comprises: the network side sending the group triggering message to each terminal of the terminal group by broadcasting, wherein the group triggering message is used for indicating each terminal of the terminal group to connect to the network;
wherein the step of the network side sending the group triggering message to each terminal of the terminal group, wherein the group triggering message is used for indicating each terminal of the terminal group to connect to the network, is embodied as: the network side sending the group triggering message to each terminal of the terminal group, wherein the group triggering message comprises identification information of the terminal group or a terminal identification set of the terminal group, the terminal identification set of the terminal group contains the terminal identification of each terminal of the terminal group;
wherein each terminal of the terminal group acquires and saves the own subscriber characteristic parameter and the identification information of the terminal group of the terminal group which the terminal belongs to;
wherein the step of each terminal of the terminal group establishing the connection with the network according to the group triggering message comprises: each terminal of the terminal group establishing the connection with the network, when receiving the group triggering message, detecting to have own Group Based Addressing characteristics and confirming that the terminal is a member of the terminal group which is indicated by the group triggering message;
wherein confirming that the terminal is the member of the terminal group which is indicated by the group triggering message comprises: the terminal confirming that the terminal is the member of the terminal group which is indicated by the group triggering message, when verifying that the identification information of the terminal group which is stored in the terminal is consistent with the identification information of the terminal group which is contained in the group triggering message; or, the terminal confirming that the terminal is the member of the terminal group which is indicated by the group triggering message, when verifying that a terminal identification which is owned by the terminal is consistent with any one of the terminal identifications in the terminal identification set of the terminal group, wherein the terminal identification set of the terminal group is contained in the group triggering message.

2. The method for triggering the terminal group according to claim 1, wherein the step of sending the group triggering message to each terminal of the terminal group, wherein the group triggering message is used for indicating each terminal of the terminal group to connect to the network, comprises:
a Machine Type Communication (MTC) server on the network side sending the group triggering message to a Home Subscriber Server (HSS), the HSS sending the group triggering message to a Mobility Management Entity (MME) which is configured to manage the terminal group, the MME sending the group triggering message to each base station which is corresponding to each terminal of the terminal group, and each base station which is corresponding to each terminal of the terminal group broadcasting the group triggering message to each terminal of the terminal group.

3. The method for triggering the terminal group according to claim 1, wherein the step of sending the group triggering message to each terminal of the terminal group, wherein the group triggering message is used for indicating each terminal of the terminal group to connect to the network, comprises:

a MTC Server sending the group triggering message to a MTC gateway or a MTC agent, the MTC gateway or the MTC agent sending the group triggering message to the MME which is configured to manage the terminal group, the MME sending the group triggering message to each base station which is corresponding to each terminal of the terminal group, and each base station which is corresponding to each terminal of the terminal group broadcasting the group triggering message to each terminal of the terminal group.

4. The method for triggering the terminal group according to claim 1, wherein the identification information of the terminal group is a Group Identification (GID) of the terminal group.

5. The method for triggering the terminal group according to claim 1, wherein the terminal identification is an International Mobile Subscriber Identification Number (IMSI) of the terminal.

6. A system for triggering a terminal group, comprising a network side equipment and the terminal group, wherein, the network side equipment is configured to send a group triggering message to each terminal of the terminal group, wherein the group triggering message is used for indicating each terminal of the terminal group to connect to the network, and the group triggering message is further used for synchronously triggering all the terminals of one terminal group; and each terminal of the terminal group is configured to establish connection with the network according to the group triggering message;

wherein the network side equipment is further configured to send the group triggering message to each terminal of the terminal group by broadcasting, wherein the group triggering message is used for indicating each terminal of the terminal group to connect to the network;

wherein the network side equipment is configured to send the group triggering message to each terminal of the terminal group, wherein the group triggering message comprises identification information of the terminal group or a terminal identification set of the terminal group, the terminal identification set of the terminal group contains the terminal identification of each terminal of the terminal group;

wherein each terminal of the terminal group is configured to establish the connection with the network, when receiving the group triggering message, detecting to have own Group Based Addressing characteristics and confirming that the terminal is a member of the terminal group which is indicated by the group triggering message;

wherein each terminal of the terminal group is further configured to confirm that the terminal is the member of the terminal group which is indicated by the group triggering message when verifying that the identification information of the terminal group which is stored in the terminal is consistent with the identification information of the terminal group which is contained in the group triggering message; or, each terminal of the terminal group is configured to confirm that the terminal is the member of the terminal group which is indicated by the group triggering message, when verifying that a terminal identification which is owned by the terminal is consistent with any one of the terminal identifications in the terminal identification set of the terminal group, wherein the terminal identification set of the terminal group is contained in the group triggering message.

7. The system for triggering the terminal group according to claim 6, wherein the network side equipment comprises a MTC Server, a HSS, a MME which is configured to manage the terminal group, and each base station which is corresponding to each terminal of the terminal group, wherein, the MTC Server is configured to send the group triggering message to the HSS;

the HSS is configured to send the group triggering message to the MME;

the MME is configured to send the group triggering message to each base station which is corresponding to each terminal of the terminal group;

and each base station which is corresponding to each terminal of the terminal group is configured to broadcast the group triggering message to each terminal of the terminal group.

8. The system for triggering the terminal group according to claim 6, wherein the network side equipment comprises a MTC Server, a MTC gateway or a MTC agent, the MME which is configured to manage the terminal group, and each base station which is corresponding to each terminal of the terminal group, wherein the MTC Server is configured to send the group triggering message to the MTC gateway or the MTC agent;

the MTC gateway or the MTC agent is configured to send the group triggering message to the MME;

the MME is configured to send the group triggering message to each base station which is corresponding to each terminal of the terminal group;

and each base station which is corresponding to each terminal of the terminal group is configured to broadcast the group triggering message to each terminal of the terminal group.

9. The system for triggering the terminal group according to claim 6, wherein each terminal of the terminal group is a MTC terminal.

* * * * *